US010244153B2

(12) United States Patent
Furutake et al.

(10) Patent No.: US 10,244,153 B2
(45) Date of Patent: Mar. 26, 2019

(54) IMAGING APPARATUS

(71) Applicant: DENSO CORPORATION, Kariya, Aichi pref. (JP)

(72) Inventors: Yasuki Furutake, Kariya (JP); Daisuke Takama, Kariya (JP); Soji Masui, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/724,122

(22) Filed: Oct. 3, 2017

(65) Prior Publication Data
US 2018/0097977 A1 Apr. 5, 2018

(30) Foreign Application Priority Data

Oct. 3, 2016 (JP) ................................. 2016-195725

(51) Int. Cl.
| H04N 5/225 | (2006.01) |
| G02B 7/02 | (2006.01) |
| G03B 17/12 | (2006.01) |
| B60R 11/04 | (2006.01) |
| B60R 11/00 | (2006.01) |

(52) U.S. Cl.
CPC .......... H04N 5/2254 (2013.01); G02B 7/021 (2013.01); G03B 17/12 (2013.01); H04N 5/2252 (2013.01); H04N 5/2257 (2013.01); B60R 11/04 (2013.01); B60R 2011/0003 (2013.01)

(58) Field of Classification Search
CPC .... H04N 5/2254; H04N 5/2252; G02B 7/021; G03B 17/12; B60R 11/04; B60R 2011/0003
See application file for complete search history.

(56) References Cited

U.S. PATENT DOCUMENTS

| 7,423,665 | B2* | 9/2008 | Ray ........................... B60R 1/00 348/113 |
| 7,963,707 | B2* | 6/2011 | Jung ...................... G03B 17/00 396/427 |
| 8,482,665 | B2* | 7/2013 | Jeon ..................... H04N 5/2257 348/149 |
| 9,407,802 | B2* | 8/2016 | Nakamura ........... H04N 5/2254 |
| 2006/0056077 | A1* | 3/2006 | Johnston ................. B60R 11/04 359/811 |

(Continued)

FOREIGN PATENT DOCUMENTS

JP 2015-022127 A 2/2015

*Primary Examiner* — Shahbaz Nazrul
(74) *Attorney, Agent, or Firm* — Knobbe, Martens, Olson & Bear, LLP

(57) ABSTRACT

An imaging apparatus provided with a lens module which has a main body and two vane members. The main body holds a lens on an inside thereof. The vane members are plate shaped sections projected from an outside surface of the main body, which are provided with through-holes enabling fastening members to be threaded through. A base is provided with an imaging element and configured to fix thereto the main body. The case which accommodates the lens, the lens module and the base has two thread-holes formed on an inside thereof, into which the fastening members are fastened thereto. The lens module is fixed to the case by threading the fastening members through the through-holes, and fastening the fastening members into the thread-holes.

21 Claims, 5 Drawing Sheets

(56) References Cited

U.S. PATENT DOCUMENTS

| | | | | |
|---|---|---|---|---|
| 2009/0196593 | A1* | 8/2009 | Cheng | G03B 15/03 396/155 |
| 2009/0244361 | A1* | 10/2009 | Gebauer | H04N 5/2253 348/373 |
| 2010/0097519 | A1* | 4/2010 | Byrne | B60R 1/00 348/373 |
| 2013/0293771 | A1* | 11/2013 | Mori | H04N 5/2252 348/374 |
| 2015/0273799 | A1* | 10/2015 | Takama | H04N 5/2257 348/373 |
| 2016/0161701 | A1 | 6/2016 | Takama et al. | |
| 2016/0202443 | A1* | 7/2016 | Knutsson | B60R 11/04 348/148 |
| 2017/0363835 | A1 | 12/2017 | Takama et al. | |

* cited by examiner

WIDTH DIRECTION

IMAGING APPARATUS

CROSS REFERENCE RELATED APPLICATION

The application is based on and claims the benefit of the priority earlier Japanese application No. 2016-195725, filed on Oct. 3, 2016, the description of which is incorporated herein by reference.

BACKGROUND

Technical Field

The present invention relates to an imaging apparatus, and in particular an imaging apparatus having an optical lens, such as an imaging apparatus for mounting on a vehicle.

Imaging apparatuses installed in a vehicle, for example, may be mounted on a windshield to capture images from a forward view of the apparatus.

The apparatus disclosed in JP2015-22127-A is an imaging apparatus for capturing images in a forward view of a vehicle in which the apparatus is mounted, which is provided with a lens, a lens module to retain the lens on an inside thereof, and a base provided having the imaging element, which is fixed to the lens module. The lens module has a box shaped base and a cylinder part which holds the lenses on an inside thereof projected to an exterior side from the base.

However, when the imaging apparatus is subjected to high temperatures in the surrounding environment, for example, due to exposure to direct sunlight in the summer time, the lens is deformed to expand which results in a change in a distance of a focal length. That is, linear coefficients of lenses in the lens module are subjected to change, due to an increased temperature, for example, and the focal point of the lens may be defocused from the imaging element. The imaging apparatus disclosed in JP2015-22127-A, has a lens module configured where an expansion degree of the lens module, compensates for movement of the lens focus point, so that the lens is not out of focus with the imaging element.

Imaging apparatuses in disclosed prior art, such as the apparatus disclosed in JP2015-22127A, are provided with a case configured to accommodate the lens, the lens module and a base on an inside thereof. It is considered that, by providing the case with at least one thread-hole formed on an inside of the case, fastening of a fastening member may be achieved, and the lens module may be fixed to the case by fastening the fastening member to the thread-hole provided. However, in the configuration described, when the lens module is fastened to the case using the fastening member, a distance between the lens and an imaging element may be changed, and the lens may become out of focus with the imaging element as a consequence.

More specifically, if a through-hole which enables threading of the fastening member is provided on a base of the lens module in the same direction as an optical axis, it is considered that the lens module may be then fixed to the case by threading the fastening member through the through-hole. However, by fixing the lens module to the base in such a manner, a load is continuously applied to the base member in the same direction as the optical axis. As a result, when the apparatus is fixed with a constant deformation applied to the base member, deformation, for example, contraction of the base member will occur due to a creep phenomenon in which stress decreases with time, in a direction of optical axis, and the distance between the lens and imaging element may also change. The lens may be defocused from the imaging element causing a decrease in the resolution of the imaging apparatus.

SUMMARY

In view of the foregoing, the present disclosure is to provide an imaging apparatus in which a change of distance between a lens and an imaging element is suppressed, when a lens module is fixed to a case.

A mode of the present disclosure is an imaging apparatus provided with a lens, a lens module, a base and a case.

The lens module has a main body and at least one vane member. The main body is configured to maintain the lens on an inside thereof. The vane members are plate shaped members projected from an outer-surface of the main body. The vane members are provided with through-holes which enable threading of fastening members.

The base which is fixed to the main body is provided with an imaging element. The case is configured to accommodate the lens, the lens module and the base member, and is provided with at least one thread-hole, formed on an inner surface thereof. The at least one thread-hole enables the fastening members to be fastened thereto. The lens module is fixed to the case by threading the fastening members into the through-holes and fastening to the thread-holes.

The imaging apparatus is configured so that the lens module is fixed to the case without the fastening members passing through to the main body. According to the configuration, as a continuous application of a load to the main body is suppressed in the same direction as an optical axis of the lens, deformation, for example, contraction of the main body is also suppressed. As a result a change in a distance between the lens and the imaging element may be also prevented.

It is to be understood that symbols in the summary and claims are used to represent a correspondence relation between specific means as a mode of the preferred embodiments, and do not limit a technical range of the present disclosure.

EMBODIMENTS

Preferred Embodiment

A preferred embodiment of the present disclosure will next be described with reference to the drawings.

1 Configuration

Figure 1:
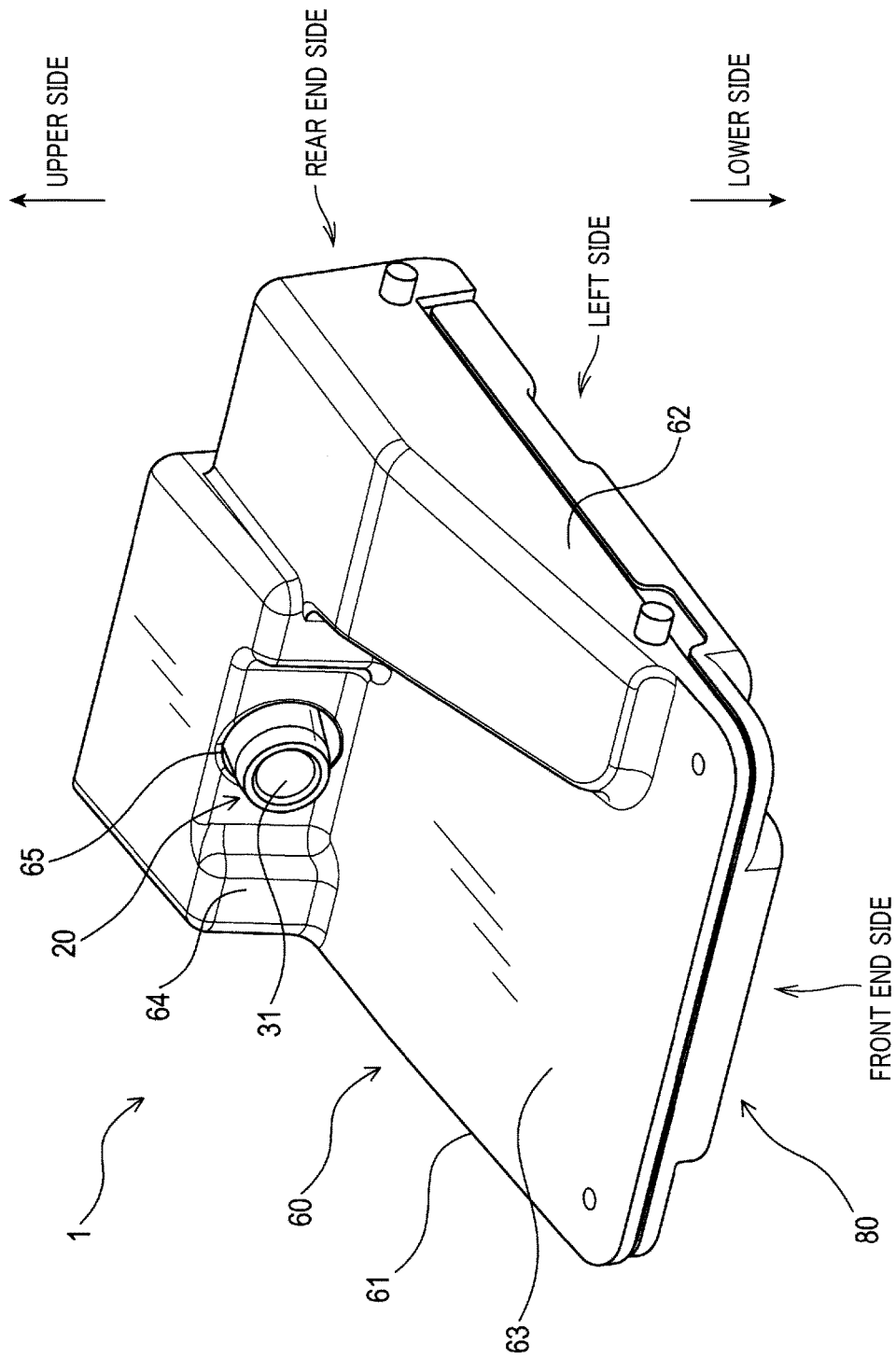
FIG. 1 is a perspective illustration of an exterior of an imaging apparatus viewed along an upper front left part thereof.
Figure 2:
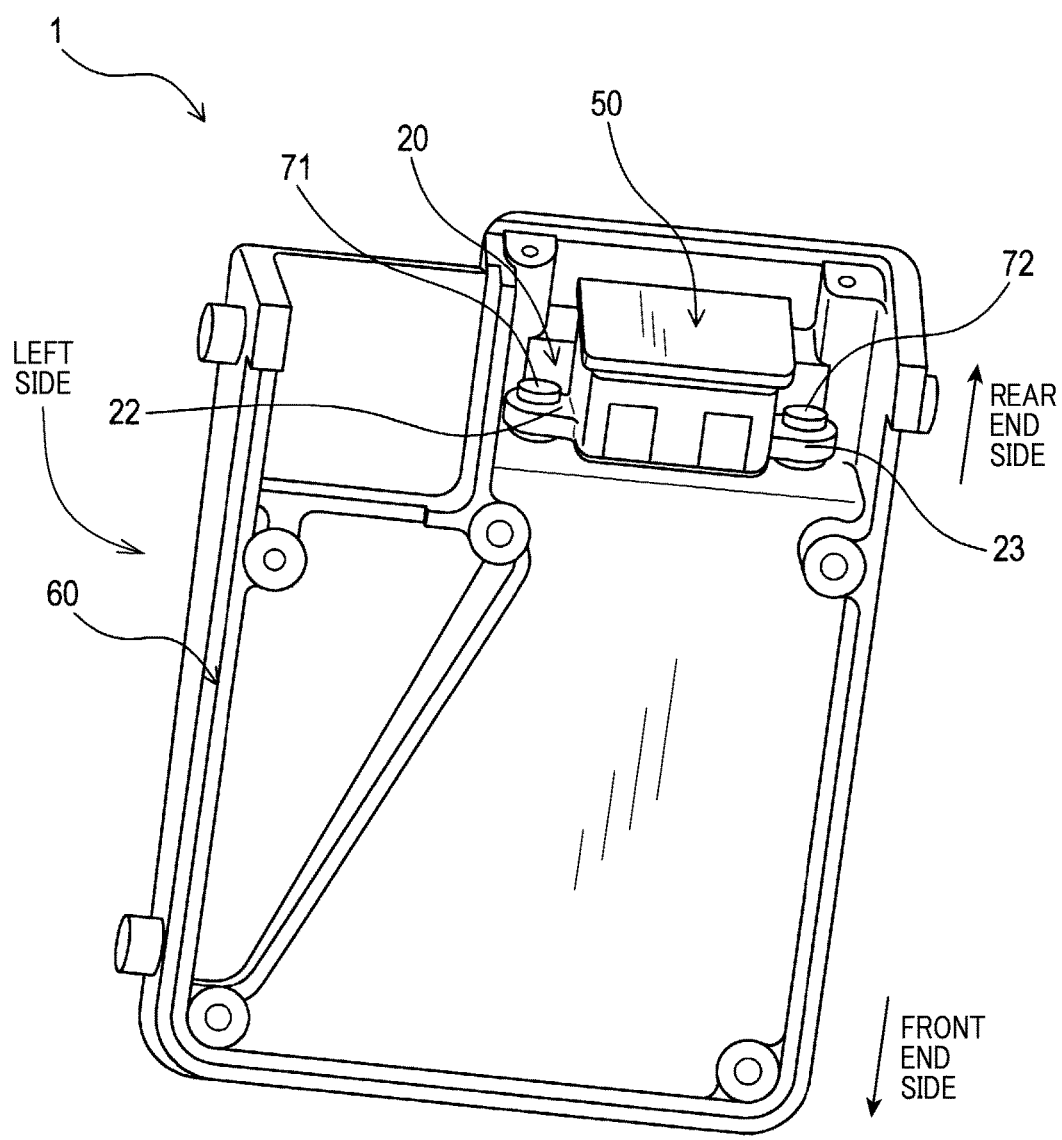
FIG. 2 shows a perspective illustration of a case with a lens module fixed thereon viewed along a lower left rear part of the apparatus.

An imaging apparatus 1 shown in FIGS. 1 and 2 is an on-vehicle camera that is mountable on an inside of a windshield of a vehicle, to capture images in a forward view of the vehicle.

It is to be understood that each of the respective front, rear, left, right, upper and lower direction of each part configuring the imaging apparatus 1 is the direction thereof when the imaging apparatus is mounted on the inside of the windshield. That is, a front direction of each part is coincident with a forward direction of the vehicle.

As shown in FIGS. 1 to 5, the imaging apparatus 1 is provided with a lens module 20, a plurality of lenses 30, a plurality of spacers 40, a base 50, a case 60, fastening members 71 and 72, and a lower cover 80.

Figure 3:
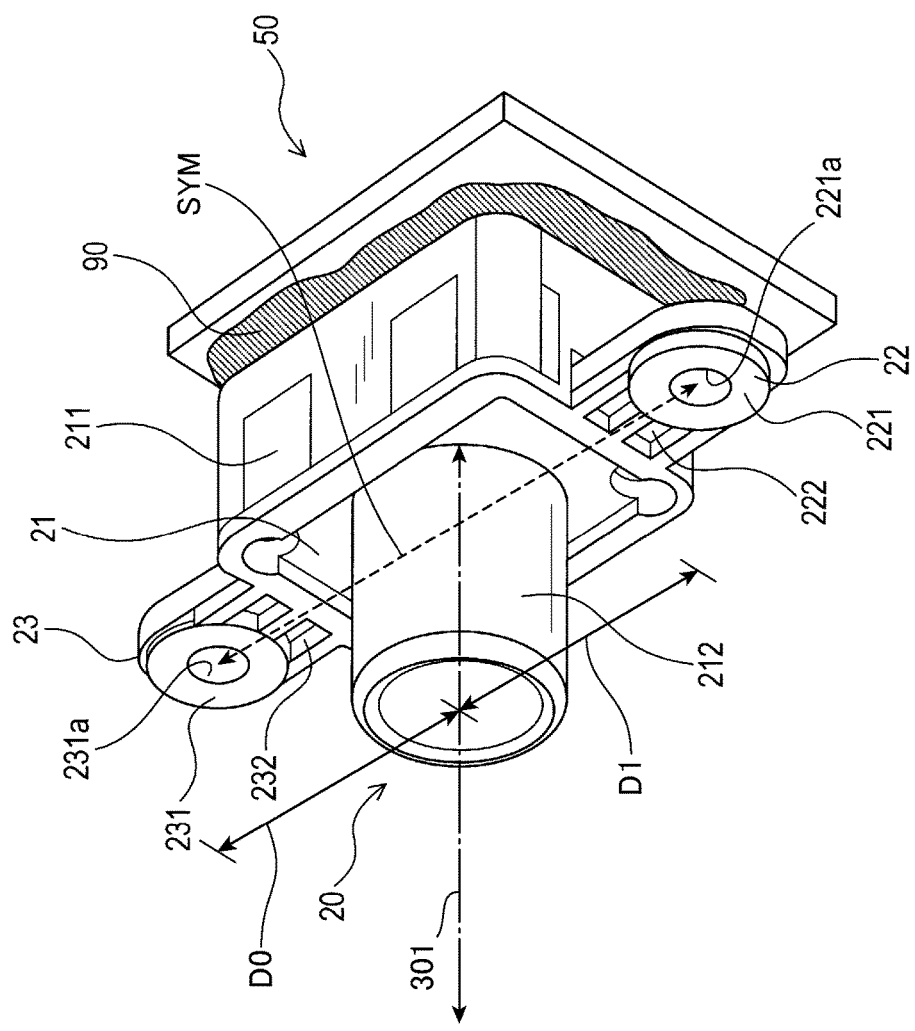
FIG. 3 shows a perspective illustration of the lens module with a base fixed thereon viewed along an upper left front side of the apparatus.
Figure 4:
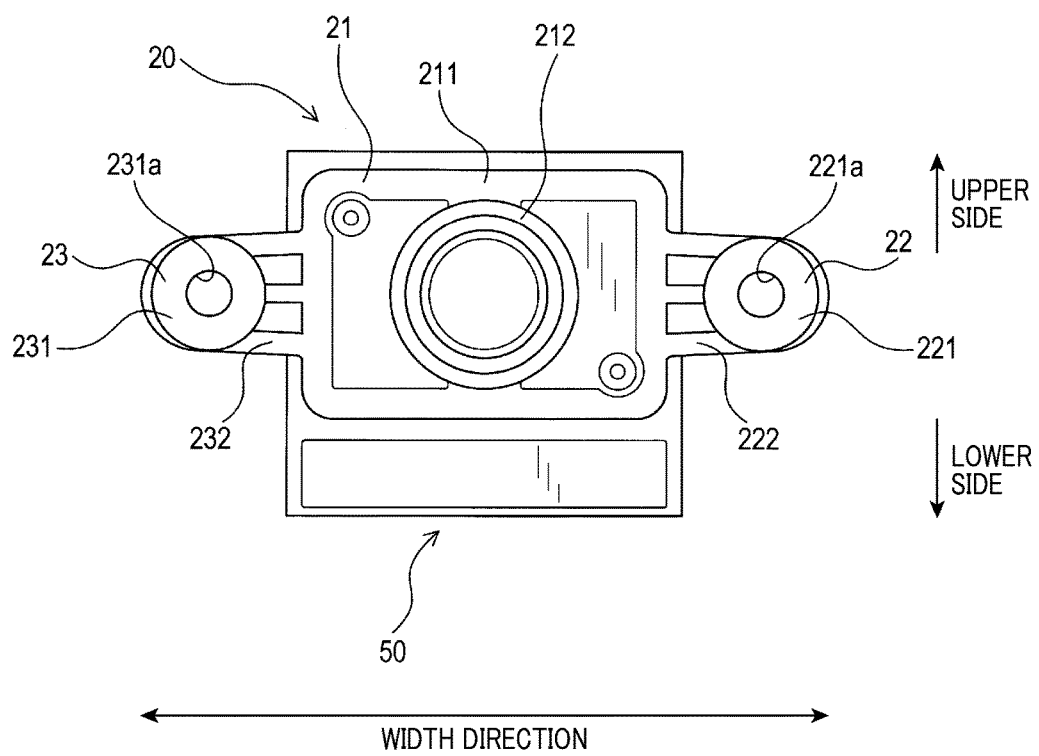
FIG. 4 is an illustration of the lens module having the base fixed thereon viewed along a front side.
Figure 5:
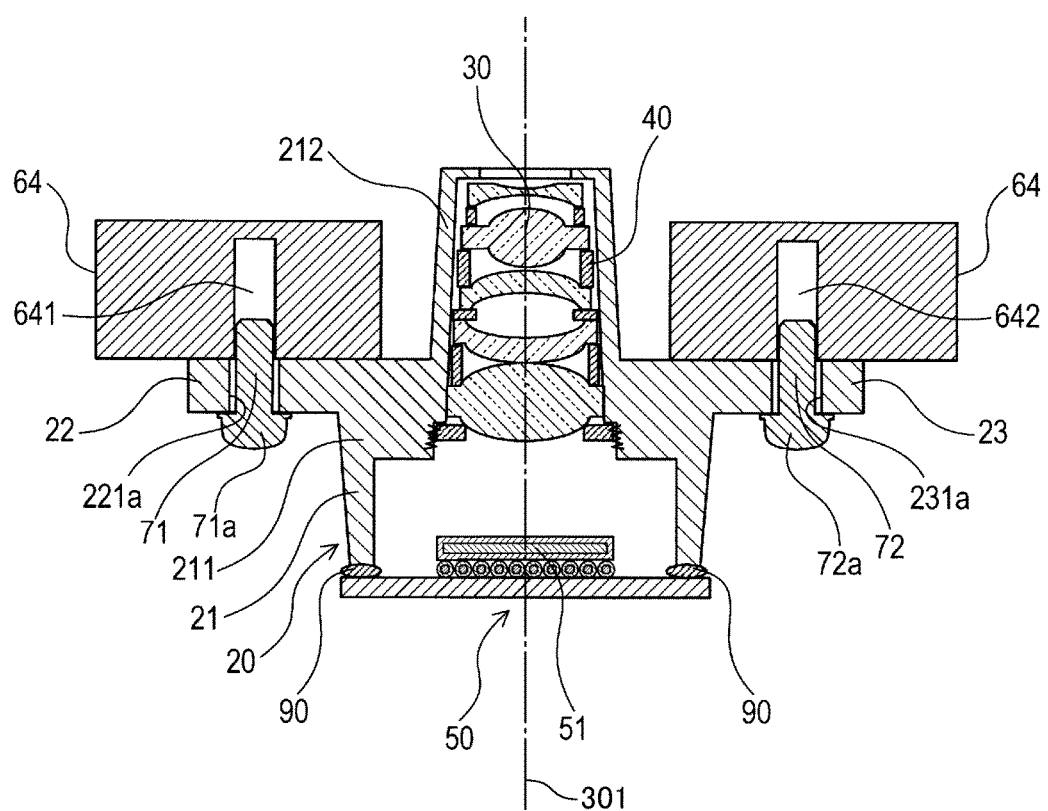
FIG. 5 is a cross sectional view showing the lens module fixed to the case using fastening members.

The lens module 20 is a resin part which includes a main body 21 and vane members 22 and 23, as shown in FIGS. 3 to 5. In the preferred embodiment, the lens module 20 is configured from a polyphenylene sulfide material.

The main body 21 has a base member 211 and a cylinder part 212. The base member 211 has a substantial rectangular parallelepiped box shape part which is open at one end.

With reference to FIG. 3, the cylinder part 212 is a cylindrically shaped part projected from a center part of an outer surface of a front side of the base member 211. The base member 211 and the cylinder part 212 are configured to retain the plurality of lenses on an inside thereof.

The plurality of spacers 40 are adjacently disposed between the lenses 30 and maintain a predetermined space therebetween. The vane members 22 and 23 are configured as plate shaped parts disposed to project from both a left and right side of an outside surface of the base member 211. The vane members 22 and 23 are of the same shape, that is, the vane members 22 and 23 are each provided with respective circular parts 221 and 231 and connectors 222 and 232.

Through-holes 221a and 231a, into which the fastening members 71 and 72 can be threaded, are formed on the respective circular parts 221 and 231. The connectors 222 and 232 are configured to extend from an outer edge of the circular parts 221 and 231. More specifically, as shown in FIG. 4, each respective connector 222 and 232 extends towards the circular parts 221 and 231 in a perpendicular direction of the main body 21, to connect the circular parts 221 and 231 with the main body 21. The vane members 22 and 23 are disposed so that a direction in which a hole passes through the through-holes 221a and 231a is coincident with a central axis of the cylinder part 212.

The vane members 22 and 23 are provided on a center part of the base member 211, with respect to an upper side and a lower side indicated in FIG. 4, when the lens 30 is viewed from an optical axis 301 thereof. The optical axis of the lens refers a position of an axis in a dead center of the lens where light is passed therethrough to the imaging element 51.

The vane members 22 and 23 are positioned on a front side of base member 211. More specifically, the vane members 22 and 23 are disposed on end surface sections on the front side of the base member 211. The vane members 22 and 23 are formed as flat surfaces with no level difference between a front outer surface thereof and a front outer surface of the base member 211.

The two vane members 22 and 23 are symmetrically disposed with the optical axis 301 in a center thereof, when viewed along the optical axis 301 of the lens 30. With reference to FIG. 3, the symmetrical position of the vane members 22 and 23 is indicated with a line SYM, with the optical axis 301 in the center. A center point of each through-hole 221a and 231a on the respective vane members 22 and 23, are radially positioned at a same distance from the optical axis 301 as the center point thereof. For example, as shown in FIG. 3, arrows D0 and D1 indicating a distance from the respective through-holes 221a to 231a to the optical axis are the same lengthwise. The center through-holes 221a and 231a and the optical axis 301 are each positioned at a same interval, for example, the same distance, from each other. That is, the two vane members 22 and 23 are disposed with the optical axis 301 interposed therebetween when viewed along the optical axis 301.

The base 50 is a substantial rectangular shaped plate configured with the imaging element 51 mounted in the center part on a front outer surface of the base 50. The base 50 is fixed to a rear end surface of the base member 211, so that a direction of a surface of the base 50 and the optical axis 301 of the lens 30 are perpendicular to each other. The base 50 is configured to be slightly larger than an outer surface of the rectangular shaped base member 211. As shown in FIG. 3, the base member 211 and the base 50 are fixed to each other using an adhesive agent. At this point, an orientation of the base 50 is adjusted with respect to the position lenses 30. An adhesion layer 90 is formed between the base member 211 and the base 50, as shown in FIGS. 3 and 5.

The case 60 shown in FIGS. 1 and 2 is a box shaped member, which is open on both a lower part and a rear end thereof, configured to accommodate the lens module 20, the lenses 30 and the base 50. The case 60 is provided with a right side wall 61 and a left side wall 62 opposed to each other with an interval in a left-right direction thereof, provided between the right-side wall 61 and the left-side wall 62. An upper wall 63, connecting the right-side wall 61 and the left side wall 62 is also disposed on an upper-side thereof.

The upper wall 63 is further provided with a raised wall section 64 which is raised in an upwards direction at a rear end of the upper wall 63, to facilitate accommodation of the lens module 20 and the base 50. The raised wall section 64 has a lens hole 65 which is opened to a front direction thereof.

As shown in FIG. 5, two thread-holes 641 and 642 enabling fastening of the fastening members 71 and 72, are formed on an inside of the raised part 64. The two thread-holes 641 and 642 are formed in direction coincident with the optical axis 301. The thread-holes 641 and 642 are provided to fix the lens module 20 to the case 60. Specifically, the fastening members 71 and 72 are threaded into the through-holes 221a and 231a, which are formed on the respective vane members 22 and 23, and fastened to the thread-holes 641 and 642.

It is to be understood that the through-holes 221a and 231a are formed to a size so that fastening member heads 71a and 72a of the respective fastening members 71 and 72 will not pass through the though holes 221a and 231a. That is, as shown in FIG. 5, the fastening member heads 71a and 72a are constructed to stop at a rear end side on the surface of the respective vane members 22 and 23.

As shown in FIG. 1, the lower cover 80 is provided to close a lower part of the case 60.

2. Effect

Advantageous effects obtained from the embodiment described will now be described.

(2a) In the first embodiment, the lens module 20 is fixed to the case 60 by passing the fastening members 71 and 72 through the through-holes 221a and 231a of the vane members 22 and 23, and also by fastening to the respective thread-holes 641 and 642. As a result, a change in the distance between the lens 30 and the imaging element 51, caused by deformation of the main body 21, can be suppressed.

More specifically, according to the first embodiment, the lens module 20 is fixed to the case 60 without passing the fastening members 71 and 72 through the main body 21. As a result, since continuous application of the load applied to the main body 21 is suppressed in the same direction as the optical axis 301 of the lens 30, contraction, for example, of the lens is thus prevented in the same direction thereof. Furthermore, a change in the distance between the lens 30 and the imaging element 51 which is caused by the contraction of the main body 21 can also be suppressed.

(2b) In the present embodiment, the change of the distance between the lens 30 and the imaging element 51 due to deformation of the base 50 can be suppressed.

More specifically, as described in the preferred embodiment, the base and the lens module are fixed, and the base is configured to be larger than the lens module, when viewed along the optical direction. In the configuration, the through-holes which enable threading of the fastening members are provided on sections of the lens module which protrude outwards from the base. As a result, the base and the case are fixed together using the fastening members.

In this way, by threading the fastening members through the base in order to fix the lens module to the case, a change in the distance between the lens and the imaging element due to deformation, for example, contraction of the lend module can be suppressed, since a load is not applied to the lens module.

However, the distance between the imaging element on the base and the lens may change by deformation, for example, curving of the base, which occurs when a load is applied to the base. In this case also, the resolution of the imaging apparatus may decrease.

In view of this issue, since the lens module 20 and the case 60 are not fixed by threading the fastening members 71 and 72 through the base, in the preferred embodiment, a change in distance between the lens 30 and the imaging element 51 by deformation of the base 50 is suppressed.

(2c) In the preferred embodiment, the two vane members 22 and 23 are symmetrically disposed with the optical axis 301 in the center thereof, when viewed along the optical axis 301 of the lens 30. The imaging apparatus 1 is thus prevented from tilting towards one side of the case 60.

Specifically, as described in the embodiment, contraction of the vane members may occur due to a creep phenomenon, if the fastening members are threaded through the through-holes provided on the vane members. If, for instance, the imaging apparatus is configured so that the vane members are not disposed symmetrically with the optical axis 301 in a center thereof, the vane members may deform, for example, contract due to the creep phenomenon, and may tilt towards a side of the case. In this respect, as described in the embodiment, if the two vane members 22 and 23 disposed symmetrically with the optical axis 301 of the lens 30 in the center, tilting towards a side of the case 60 can be prevented, even in a case of the vane members 22 and 23 contracting due to the creep phenomenon.

(2d) In the preferred embodiment, the vane members 22 and 23 are disposed at the front side of the base member 211, that is, on the end section of the base member 211 on a surface side in which the cylinder part 212 is disposed. As a result, a compact case may also be achieved.

Supposing that the vane members are disposed on an end section at a rear end side of the base member 211, the fastening member heads 71a and 72a of the fastening members 71 and 72, which are threaded into the through-holes provided on the vane members 22 and 23, may project more to the rear end-side of the base member 211 than the lens module. In this case, the case is configured to also cover the projecting fastening member heads, therefore it will also be necessary to increase the size of the case by the size of the projected fastening member heads. In this regard, in the present embodiment, the vane members 22 and 23 are provided on the end section at the front end side of the base member 211, which makes it difficult for the fastening member heads 71a and 72a to project nearer to the rear end side than the lens module 20. As a result, according to the configuration described, a reduction in the case size can be achieved, compared to a configuration in which the vane members 22 and 23 are provided on the end section of the rear end side a base member.

(2e) In the preferred embodiment, the base 50 is fixed to the lens module 20 using the adhesive agent with the position of the base 50 adjusted. The pre-adjusted position of the base 50 can thus be fixed using the fastening members 71 and 72, which can also suppress a change of position between the lens module 20 and the base 50.

That is, light from in front of the vehicle is generally incident to the lenses 30 at a particular inclined angle with respect to the optical axis 301. It is thus necessary to adjust the facing direction of the base 50 in relation to the lenses 30, in order for the light to form an image on the imaging element. In the preferred embodiment, an adhesive agent is used to fix the base 50 to the lens module 20, enabling an orientation and position, for example, of the base 50 to be adjusted.

As previously described in (2b), when the lens module 20 is fixed to the case 60 by threading the fastening members through the base, the base may deform, for example, curve, and the adhesive agent, that is, the adhesion layer may rip or deform as a result. In this case, the pre-adjusted direction of the base changes. However, in the present configuration, fixing of the lens module 20 to the case 60 is performed without threading the fastening members 71a and 72a through base 50. The position of the base 50 may be thus adjusted in relation with the lens module 20, and the base 50 may be fixed thereto the lens module 20, using the fastening members 71 and 72 with the pre-adjusted position of the base 50 maintained. As a result, a change in the orientation or the position of the base is suppressed.

(2f) In the present embodiment, the lens module 20 is configured of polyphenylene sulfide. In general, polyphenylene sulfide has properties of which makes it difficult for the creep phenomena to occurs. As a result, according to the embodiment, the deformation of the lens module 20 due to the creep phenomena also occurs with difficulty.

3. Other Embodiments

The mode of the present disclosure is not limited to the above described and may be accomplished by various modes.

Specifically, the following modifications may be included within the scope of the present disclosure. For example, the lens module 20 is provided with two vane members 22 and 23 according to the embodiment described, however the number of vane members is not limited to only 2. For example, the lens module may be provided with either 1, or more than 3 vane members.

In the case of providing more than 3 vane members, the plurality of vane members may be disposed symmetrically with the optical axis 301 in the center thereof, when viewed along the optical axis 301 of the lens. In this case, the plurality of vane members may be configured so that a center of a through-hole formed on the plurality of vane members is positioned at a tip point of a regular polygon which is the center of the optical axis 301.

If the configuration includes more than 3 vane members, at least two among the plurality of vane members can be disposed symmetrically with the optical axis 301 in the center thereof. In this case, among the plurality of vane members, only a part of the vane members, for example, may be disposed symmetrically, with the optical axis 301 provided in the center thereof. This configuration will also elicit the same effects as those described for the embodiment in (2c).

The lens module 20 according to the embodiment is formed from polyphenylene sulfide, however, the material used for forming the lens module is not limited to a polyphenylene material, and the lens module may be, for example, other resins.

The lens 30 according to the embodiment is configured with a plurality of lenses, however, the lens in the lens module is not limited to a plurality and may also be configured from one lens or at least one lens.

The base 50 according to the embodiment is fixed to the lens module 20 using an adhesive agent, however, fixing of the aforementioned elements is not limited to using an adhesive agent. The base 50, for example, can be fixed to the lens module without using an adhesive agent.

In another example, an element having a plurality of functions may be actualized by a plurality of elements, and a single element provided with one function may be actualized by a plurality of configuring elements. In the same manner, a plurality of configuring elements provided with a plurality of functions may be actualized by a single element, and a plurality of elements actualizing a single function may be substituted by a single element actualizing the single function. Some of the configuring elements of the preferred embodiment may be omitted, and at least some of the configuring elements of the preferred embodiment may be added to the other embodiments or substituted by a different element.

REFERENCE SIGN LIST

1 . . . imaging apparatus
20 . . . lens module
21 . . . main body
22, 23 . . . vane member
30 . . . lens
50 . . . base
51 . . . imaging element
60 . . . case
71, 72 . . . fastening member
221a, 231a . . . through-hole
641, 642 . . . thread-hole

What is claimed is:

1. An imaging apparatus for capturing images in a forward view of the apparatus, comprising;
    a lens;
    a lens module provided with a main body and at least one vane member;
    a base provided with an imaging element; and
    a case configured to accommodate the lens, the lens module and the base, wherein,
    the main body is configured to retain the lens on an inside thereof,
    the at least one vane member is configured as a plate shaped part having a through-hole, which enables a fastening member to be threaded through the through-hole,
    the base is fixed to the main body,
    the case is provided with at least one thread-hole, which enables the fastening member to be fastened thereto, and
    the lens module is configured to be fixed to the case without intervention of the base between the lens module and the case, by threading the fastening member through the through-hole and fastening the fastening member to the thread-hole.

2. The imaging apparatus according to claim 1, wherein, the lens has an optical axis passing through a center of the lens, the main body has a width direction, and the through-hole is positioned nearer to an outer-side thereof than the main body in the width direction of the main body, when viewed from the optical axis.

3. The imaging apparatus according to claim 2, wherein, the at least one vane member is a plurality of vane members and the plurality of vane members are symmetrically disposed with the optical axis of the lens positioned in the center, when viewed from the optical axis of the lens.

4. The imaging apparatus according to claim 1, wherein, the lens module is configured with the base provided with a box shaped base member and a cylinder part, the cylinder part is configured to project parallel to the optical axis, on an outer surface of the base member and keep the lens on an inside thereof, and the at the least one vane member is provided on an end section of the base member on a side in which the cylinder part is mounted.

5. The imaging apparatus according to claim 1, wherein, the base is fixed to the lens module by using an adhesive agent.

6. The imaging apparatus according to claim 1, wherein the lens module contains polyphenylene sulfide.

7. The imaging apparatus according to claim 1, wherein, the apparatus is mountable inside a vehicle, for capturing images in a forward view of the vehicle.

8. The imaging apparatus according to claim 2, wherein, the at least one vane member is a plurality of vane members and the plurality of vane members are symmetrically disposed with the optical axis of the lens positioned in the center, when viewed from the optical axis of the lens.

9. The imaging apparatus according to claim 2, wherein, the lens module is configured with the base provided with a box shaped base member and a cylinder part, the cylinder part is configured to project parallel to the optical axis, on an outer surface of the base member and keep the lens on an inside thereof, and the at the least one vane member is provided on an end section of the base member on a side in which the cylinder part is mounted.

10. The imaging apparatus according to claim 3, wherein, the lens module is configured with the base provided with a box shaped base member and a cylinder part, the cylinder part is configured to project parallel to the optical axis, on an outer surface of the base member and keep the lens on an inside thereof, and the at the least one vane member is provided on an end section of the base member on a side in which the cylinder part is mounted.

11. The imaging apparatus according to claim 2, wherein, the base is fixed to the lens module by using an adhesive agent.

12. The imaging apparatus according to claim 3, wherein, the base is fixed to the lens module by using an adhesive agent.

13. The imaging apparatus according to claim 4, wherein, the base is fixed to the lens module by using an adhesive agent.

14. The imaging apparatus according to claim 2, wherein, the lens module contains polyphenylene sulfide.

15. The imaging apparatus according to claim 3, wherein, the lens module contains polyphenylene sulfide.

16. The imaging apparatus according to claim 4, wherein, the lens module contains polyphenylene sulfide.

17. The imaging apparatus according to claim 2, wherein, the apparatus is mountable inside a vehicle, for capturing images in a forward view of the vehicle.

18. The imaging apparatus according to claim 3, wherein, the apparatus is mountable inside a vehicle, for capturing images in a forward view of the vehicle.

19. The imaging apparatus according to claim 4, wherein, the apparatus is mountable inside a vehicle, for capturing images in a forward view of the vehicle.

20. The imaging apparatus according to claim 5, wherein, the apparatus is mountable inside a vehicle, for capturing images in a forward view of the vehicle.

21. The imaging apparatus according to claim 1, wherein, the case includes a wall portion having the at least one thread-hole into which the fastening member is fastened.

* * * * *

UNITED STATES PATENT AND TRADEMARK OFFICE
CERTIFICATE OF CORRECTION

PATENT NO. : 10,244,153 B2
APPLICATION NO. : 15/724122
DATED : March 26, 2019
INVENTOR(S) : Yasuki Furutake It is certified that error appears in the above-identified patent and that said Letters Patent is hereby corrected as shown below:

In the Claims

In Column 8, Line 30, Claim 4, change "the at the" to --the at--.

In Column 8, Line 36, Claim 6, change "wherein" to --wherein,--.

In Column 8, Line 51, Claim 9, change "the at the" to --the at--.

In Column 8, Line 59, Claim 10, change "the at the" to --the at--.

Signed and Sealed this
Eighteenth Day of June, 2019

Andrei Iancu
*Director of the United States Patent and Trademark Office*